United States Patent
Sakamoto et al.

(10) Patent No.: US 6,183,616 B1
(45) Date of Patent: Feb. 6, 2001

(54) METHOD OF ELECTROLYTE BATH STABILIZATION

(75) Inventors: Hiroyuki Sakamoto, Kobe; Takayuki Kokubun, Suita; Ichiro Kawakami, Takatsuki; Toshitaka Kawanami, Kawabe-gun; Hitoshi Hori, Ibaraki; Takao Saito, Toyonaka, all of (JP)

(73) Assignee: Nippon Paint Co., Ltd., Osaka (JP)

(*) Notice: Under 35 U.S.C. 154(b), the term of this patent shall be extended for 0 days.

(21) Appl. No.: 09/358,845

(22) Filed: Jul. 22, 1999

(30) Foreign Application Priority Data

Jul. 22, 1998 (JP) .................................................. 10-206519
Jul. 22, 1998 (JP) .................................................. 10-206520

(51) Int. Cl.$^7$ .................................................. C25D 13/10

(52) U.S. Cl. .......................... 204/489; 204/504; 523/404; 525/525; 525/530

(58) Field of Search .............................. 523/404; 525/525, 525/530; 204/489, 504

(56) References Cited

U.S. PATENT DOCUMENTS 5,003,025 * 3/1991 Dobbelstein et al. ................. 528/45

* cited by examiner

*Primary Examiner*—Robert Dawson
*Assistant Examiner*—D. Aylward
(74) *Attorney, Agent, or Firm*—Pollock, Vande Sande & Amernick

(57) ABSTRACT

A method of stabilization of electrolyte bath in electrocoating by immersing a substrate in the bath filled with a cationic electrocoating composition containing a basic resin and an amine compound and carrying out electrocoating;

wherein said basic resin in said bath contains, per 100 grams of the resin solids, 10 to 300 millimoles of sulfonium group and 50 to 2,000 millimoles of carbon—carbon unsaturated bond, and said amine compound is contained in an amount of 1 to 50 millimoles per 100 grams of the basic resin solids in the bath, said amount being not less than 5 mole percent relative to the sulfonium group content in said basic resin, so that the sulfonium group remaining in the coat amount to not more than 50% relative to the sulfonium group contained in the electrocoating composition in said bath.

9 Claims, 2 Drawing Sheets

METHOD OF ELECTROLYTE BATH STABILIZATION

TECHNICAL FIELD

The present invention relates to a method of stabilizing electrolyte bath, which facilitates the control of the electrolyte bath comprising a cationic electrocoating composition.

PRIOR ART

Cationic electrocoating can provide substrates or coating target articles with coatings every nook and cranny even when said substrates are complicated in form or shape and can be performed automatically and continuously. Therefore, it is in general use as a technique of forming an undercoat on substrates, such as automotive bodies, which have a large size and are complicated in form or shape and are required to be highly resistant to rusting. Furthermore, said technique is very highly efficient from the coating composition consumption viewpoint, hence economical, as compared with other methods of coating and, therefore, it has come into wide use as an industrial method of coating.

In such cationic electrocoating, electrocoating compositions mainly containing polyaminated resin having a skeleton of epoxy resin or acrylic resin have been in general use. Generally, they are positively charged as a result of neutralization with organic acid.

Cationic electrocoating is carried out by immersing a substrate, which is to serve as a cathode, in a cationic electrocoating composition and applying a voltage. The deposition of a coating layer on the substrate involves electrochemical reaction and the coating layer that has deposited on the substrate surface upon voltage application has an insulating property. Therefore, with the progress of deposition of the coating in the process of coating, hence with the increase in deposit layer thickness, the electric resistance of the coating layer increases in proportion to the increase in layer thickness. As a result, the deposition of the coating composition at that site decreases and, instead, the deposition of a coating layer on some other uncoated site begins. In this way, the deposition of emulsion particles of the coating composition takes place successively from uncoated site to uncoated site. In the present specification, such successive formation of a coating on uncoated sites of a substrate is referred to as "throwing power".

However, when cationic electrocoating compositions having such neutralized amino groups as hydratable group are used, the ion release from the amino group is reversible, and the deposition behavior and/or film characteristics are changeable sensitively depending on the temperature conditions of the coating bath. This state of affairs is shown in FIG. 1 and FIG. 2. As is evident from FIG. 1, the thickness of the deposit film changes widely as the bath temperature changes. Further, as is evident from FIG. 2, film smoothness can be maintained only in a narrow temperature range. Therefore, for attaining good throwing power and maintaining the desired deposit film thickness and smoothness, it is necessary to control the bath temperature within limits of variability of about ±2° C., for instance. The burden of bath control is thus very heavy.

Meanwhile, WO 98/03701 discloses a cationic electrocoating composition differing from the conventional electrocoating compositions having neutralized amino groups as hydratable group. Said composition comprises a basic resin containing sulfonium group and triple bond, such as an ethynyl or nitrile group, within the molecule. However, the above-cited publication does not disclose any relationship between the bath temperature and the deposit film thickness and smoothness, although it describes that said cationic electrocoating composition is excellent in throwing power.

SUMMARY OF THE INVENTION

In view of the current state of the art as mentioned above, the present invention has its object to provide a method of stabilizing electrolyte bath by which excellent throwing power can be obtained and bath control can be facilitated for maintaining the desired deposit film thickness and smoothness.

The present invention provides a method of stabilization of electrolyte bath in electrocoating for obtaining electrodeposition coat by immersing a substrate in the electrolyte bath filled with a cationic electrocoating composition containing a basic resin and an amine compound and carrying out electrocoating; wherein said basic resin in said electrolyte bath contains, per 100 grams of the resin solids, 10 to 300 millimoles of sulfonium group and 50 to 2,000 millimoles of carbon—carbon unsaturated bond, and said amine compound is contained in an amount of 1 to 50 millimoles per 100 grams of the basic resin solids in the electrolyte bath, said amount being not less than 5 mole percent relative to the sulfonium group content in said basic resin, so that the sulfonium group remaining in said electrodeposition coat amount to not more than 50% relative to the sulfonium group contained in the electrocoating composition in said electrolyte bath.

According to an advantageous aspect of the invention, carbon—carbon triple bond of propargyl group accounts for at least 15% of said carbon—carbon unsaturated bond.

DETAILED DESCRIPTION OF THE INVENTION

Figure 1:
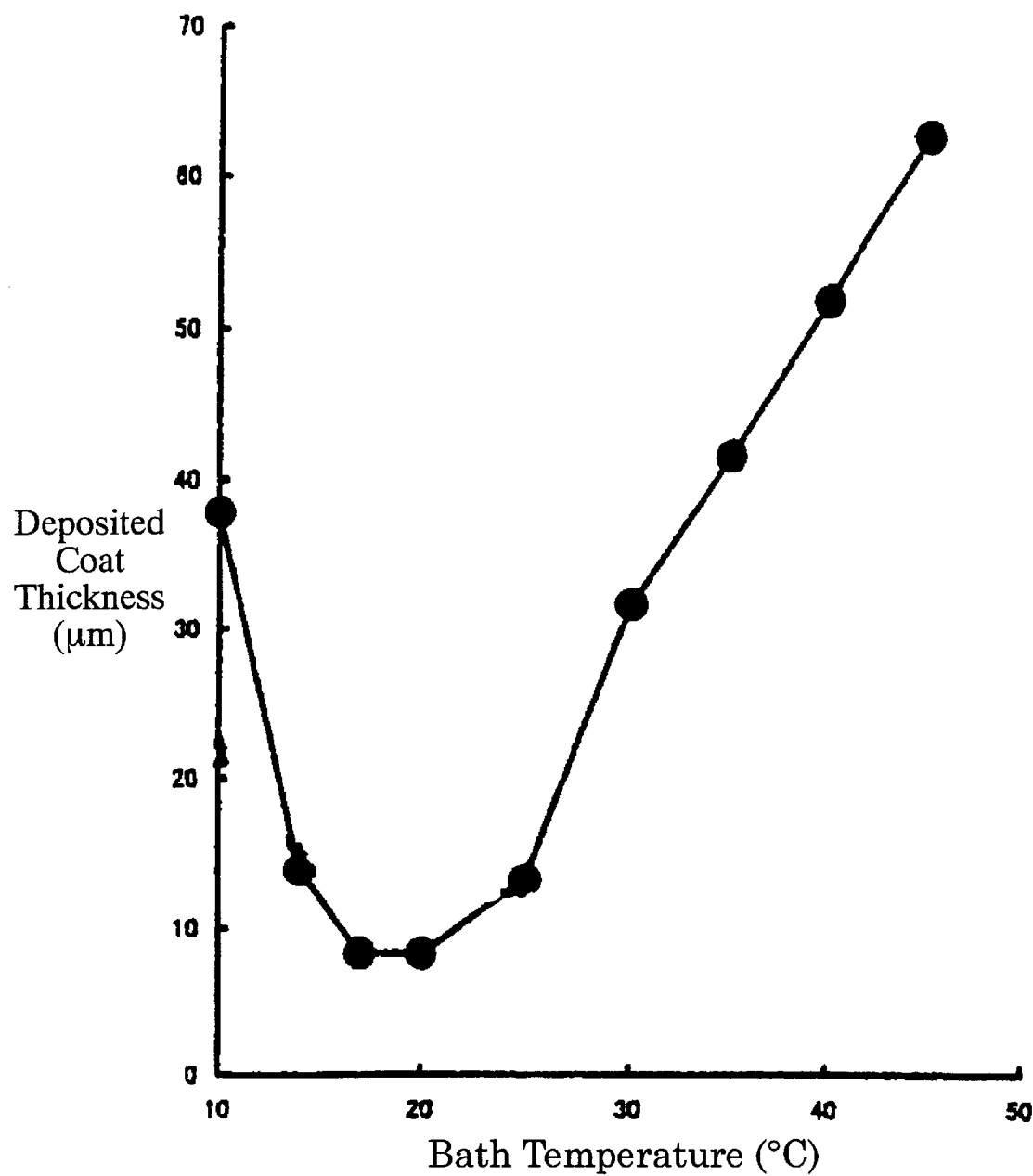
FIG. 1 is a graphic representation of the changes in deposit coat thickness encountered with a conventional cationic electrocoating composition (at a voltage of 250 V, SPC-treated sheets used) as a function of the temperature.

The method for electrolyte bath stabilization according to the present invention is adopted in cationic electrocoating for obtaining electrodeposition coat by immersing a substrate in electrolyte bath filled with a cationic electrocoating composition containing a basic resin and an amine compound and then carrying out electrocoating.

Said cationic electrocoating composition contains a basic resin and an amine compound. Said basic resin contains sulfonium group and carbon—carbon unsaturated bond.

Said sulfonium group is a hydratable functional group in the basic resin. When applying a voltage or current at or above a certain level during the electrocoating process, the sulfonium group undergoes electrolytic reduction on an electrode, whereupon the ionic group disappears to form a sulfide, so that it can irreversibly become nonconductor, as illustrated below. It can be considered that owing to this fact the above cationic electrocoating composition displays a high level of throwing power.

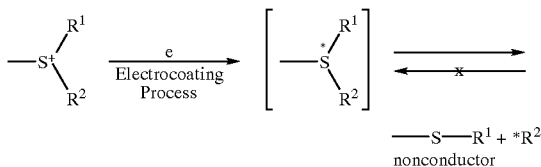

It can also be considered that, during this electrocoating process, electrode reaction is induced and the resulting hydroxide ion is kept by the sulfonium group, thus electrolytically generating a base in the electrodeposition coat. This electrolytically generated base can convert the propargyl group occurring in the electrodeposition coat, which has low thermal reactivity, to allene bond, which has high thermal reactivity.

The sulfonium group content is 10 to 300 millimoles per 100 g of the basic resin solid content. When it is less than 10 millimoles per 100 g, sufficient throwing power or curability cannot be obtained and, further, the hydratability and bath stability will be poor. When it is above 300 millimoles per 100 g, the deposition of coat on the surface of articles becomes poor. A preferred range is 10 to 250 millimoles, more preferably 10 to 150 millimoles, per 100 g of the basic resin solid content.

Said carbon—carbon unsaturated bond is carbon—carbon double bond or triple bond. This carbon—carbon unsaturated bond may occur terminally in the molecule of the basic resin, or somewhere within the molecular chain constituting the skeleton of said basic resin. Said carbon—carbon unsaturated bond functions as a curing functional group. When it coexists with sulfonium group, it can also improve the throwing power of the resin composition further, although the reason is not known.

The content of said carbon—carbon unsaturated bond is 50 to 2,000 millimoles per 100 g of the basic resin solid content of the above cationic electrocoating composition. When it is less than 50 millimoles per 100 g, sufficient throwing power or curability cannot be obtained. When it is above 2,000 millimoles per 100 g, the hydration stability will be adversely affected when used as a cationic electrocoating composition and the deposition of coat on the surface of articles will become poor. A preferred range is 80 to 1,000 millimoles, more preferably 80 to 500 millimoles, per 100 g of the basic resin solid content.

In said basic resin, it is preferable in view of the curability that at least 15%, in number, of said carbon—carbon unsaturated bond be accounted for by carbon—carbon triple bond of propargyl group.

For example, even when introducing a compound having a plurality of carbon—carbon double bonds per molecule, such as a long-chain unsaturated fatty acid, the content of the carbon—carbon unsaturated bond is expressed in terms of the introduction content of said compound itself having a plurality of carbon—carbon double bonds. This is because even if a compound having a plurality of carbon—carbon double bonds per molecule is introduced, substantially only one carbon—carbon double bond among them is presumably involved in curing reactions.

Said basic resin is not particularly restricted provided that it has the sulfonium group or the carbon—carbon unsaturated bond. Acrylic resin or epoxy resin can be employed but said basic resin is preferably a polyepoxide having at least two epoxy groups per molecule so that the sulfonium group and/or the carbon—carbon unsaturated bond can easily be introduced into the resin skeleton. Said polyepoxide is not particularly restricted but can include, for example, epi-bis type epoxy resins, modifications thereof derived by chain elongation with a diol, dicarboxylic acid or diamine, etc; epoxidized polybutadiene; novolak phenol-type polyepoxy resins; novolak cresol-type polyepoxy resins; poly(glycidyl acrylate); poly(glycidyl ether)s of aliphatic polyols or polyether polyols; poly(glycidyl ester)s of polybasic carboxylic acids and the like. Among these, novolak phenol-type polyepoxy resins, novolak cresol-type polyepoxy resins and poly(glycidyl acrylate) are preferred because of ease of polyfunctionalization.

The polyepoxide mentioned above preferably has a number average molecular weight of 500 to 20,000. When the number average molecular weight is less than 500, the coating efficiency of the cationic electrodeposition is poor. When it exceeds 20,000, good coats cannot be formed on the surface of articles. A more preferred number average molecular weight range can be established according to the resin skeleton. In the case of novolak phenol-type epoxy resins and novolak cresol-type epoxy resins, for instance, a molecular weight of 700 to 5,000 is more preferred.

In cases where the skeleton of said basic resin is such polyepoxide, the sulfonium group and the carbon—carbon unsaturated bond are introduced thereinto via the epoxy group of said polyepoxide. Said basic resin preferably contains both the sulfonium group and the carbon—carbon unsaturated bond within each molecule, but this is not always necessary. Thus, for instance, only one of the sulfonium group and carbon—carbon unsaturated bond may be contained in a molecule. In this latter case, the resin molecules constituting the basic resin, as a whole, contain all of said two kinds of functional groups. Thus, said basic resin may be composed of a plurality of resin molecules having one or two or more of the sulfonium group and carbon—carbon unsaturated bond. The basic resin, so referred to in the present specification, contains the sulfonium group and carbon—carbon unsaturated bond according to the above meaning.

A second component in the cationic electrodeposition coating composition used for the method of electrolyte bath stabilization according to the present invention is an amine compound. By defining the content of said amine compound in the cationic electrocoating composition, the stability of the electrolyte bath can be improved. Said amine compound is not particularly restricted but can include, for example, primary to tertiary mono- and polyfunctional aliphatic amines, alicyclic amines, aromatic amines and like amine compounds. Among these, water-soluble or water-dispersible ones are preferred. As such, there may be mentioned, for example, alkylamines containing 2 to 8 carbon atoms, such as monomethylamine, dimethylamine, trimethylamine, triethylamine, propylamine, diisopropylamine, tributylamine, etc.; monoethanolamine, diethanolamine, methylethanolamine, dimethylethanolamine, cyclohexylamine, morpholine, N-methylmorpholine, pyridine, pyrazine, piperidine, imidazoline, imidazole, and the like. These may be used singly or two or more may be used combinedly. Among them, hydroxyamines, such as monoethanolamine, diethanolamine and dimethylethanolamine, are preferred because of good aqueous dispersion stability.

Said amine compound can be incorporated directly in the cationic electrocoating composition of the invention. In the case of conventional neutralization type amine-based cationic electrocoating compositions, the addition of a free amine deprives a neutralizing acid in the resin, whereby the stability of the electrolyte bath is markedly worsened. To the contrary, in the case of the present invention, no such bath stability disturbance is encountered.

The level of said amine compound added is 1 to 50 millimoles per 100 grams of the basic resin solids. If said level is lower than 1 millimole per 100 grams, the effect of the addition of said compound will not be produced. A level above 50 millimoles per 100 grams cannot be expected to produce an effect proportional to the addition level and is uneconomical. A preferred addition level is 1 to 30 millimoles per 100 grams. In addition to the above requirement, it is necessary that the amount of said amine compound be not less than 5 mole percent relative to the content of the sulfonium group in the basic resin contained in the cationic electrocoating composition. When the amount of the amine compound is less than 5 mole percent relative to the sulfonium group content in the basic resin, the amine compound fails to sufficiently contribute to an improvement in the rate of conversion of the sulfonium group to the sulfide even if the addition level requirement mentioned above is satisfied. Preferably, said amount is not less than 7 mole percent.

In the method for electrolyte bath stabilization according to the present invention, the sulfonium group remaining in the electrodeposition coat obtained by carrying out electrocoating should be less than 50% of the sulfonium group contained in the electrocoating composition in the electrolyte bath. This requirement can be satisfied by restricting the content of the amine compound within the range mentioned above. If the content of the residual sulfonium group is not less than 50% of the sulfonium group contained in the electrocoating composition in the electrolyte bath or, in other words, if not less than 50% of the sulfonium group contained in such basic resin prior to electrodeposition remains as the sulfonium group as it is without being converted to the sulfide form, the influences of the bath temperature on the deposition behavior and/or smoothness are remarkable, making bath control difficult. A preferred level is less than 40%.

When the amount of the sulfonium group remaining in the coat is less than 40% of the sulfonium group contained in the electrocoating composition in the electrolyte bath, the coating thickness can be made constant irrespective of substrate material.

In the following, the method of producing the basic resin is described taking, as a typical example, the case of using epoxy resin. In cases where some resin other than epoxy resin is used, the basic resin production is possible if the method mentioned below is appropriately modified. Said basic resin can advantageously be produced, for example, by the step (step (1)) of reacting an epoxy resin having at least two epoxy groups per molecule with a compound having a functional group capable of reacting with epoxy group and having carbon—carbon unsaturated bond to give an epoxy resin containing the carbon—carbon unsaturated bond and the step (step (2)) of introducing sulfonium group into the remaining epoxy groups in the epoxy resin containing carbon—carbon unsaturated bond as obtained in step (1).

Suited for use as said epoxy resin having at least two epoxy groups per molecule are those polyepoxy resins mentioned above and the like.

The compound having a functional group reactive with epoxy group and having carbon—carbon unsaturated bond may be, for example, a compound having both a functional group reactive with epoxy, such as a hydroxyl or carboxyl group, and carbon—carbon unsaturated bond. As specific examples, there may be mentioned compounds having hydroxyl or carboxyl group and carbon—carbon triple bond, such as propargyl alcohol, propargylic acid, etc.; compounds having hydroxyl group and carbon—carbon double bond, such as 2-hydroxyethyl acrylate, 2-hydroxyethyl methacrylate, hydroxypropyl acrylate, hydroxypropyl methacrylate, hydroxybutyl acrylate, hydroxybutyl methacrylate, allyl alcohol, methallyl alcohol, etc.; compounds having carboxyl group and carbon—carbon double bond, such as acrylic acid, methacrylic acid, ethacrylic acid, crotonic acid, maleic acid, phthalic acid, itaconic acid, etc.; half esters such as maleic acid ethyl ester, fumaric acid ethyl ester, itaconic acid ethyl ester, succinic acid mono(meth) acryloyloxyethyl ester, phthalic acid mono(meth) acryloyloxyethyl ester, etc.; synthetic unsaturated fatty acids such as oleic acid, ricinolic acid, etc.; natural unsaturated fatty acids such as linseed oil and soybean oil, and the like.

As for the reaction conditions in step (1), the reaction is generally carried out at room temperature or 80 to 140° C. for several hours. If necessary, an ingredient or ingredients known and necessary for the progress of the reaction, for example a catalyst and/or a solvent, can be used. The completion of the reaction can be confirmed by measuring the epoxy equivalent, and the functional groups introduced can be confirmed by nonvolatile matter measurement and instrumental analysis of the resin obtained.

A step, other than the above step (1), of preparing an epoxy resin containing carbon—carbon unsaturated bond may comprise copolymerizing a monomer having carbon—carbon unsaturated bond within the molecule for example a monomer derived from glycidyl methacrylate by addition of propargyl alcohol, with another monomer. Said other monomer is not particularly restricted provided that it is copolymerizable with the monomer mentioned above. As examples of said other monomer, there may be mentioned, among others, methyl, ethyl, propyl, n-butyl, i-butyl, t-butyl, 2-ethylhexyl, lauryl, phenyl, benzyl, 2-hydroxyethyl, 2-hydroxypropyl, 4-hydroxybutyl and like esters of acrylic acid or methacrylic acid; Placcel FM (trademark) series (2-hydroxyethyl methacrylate-caprolactone adducts, available from Daicel Chemical Industries); acrylamide and derivatives thereof, such as N-methylolacrylamide; styrene, α-methylstyrene, vinyl acetate and the like.

In step (2), a sulfonium group is introduced into the residual epoxy groups of the epoxy resin containing carbon—carbon unsaturated bond as obtained in step (1) or, as the case may be, as obtained by copolymerizing the above-mentioned monomer containing carbon—carbon unsaturated bond within the molecule with another monomer. The sulfonium introduction can be carried out, for example, by subjecting a sulfide/acid mixture to react with epoxy group for sulfide introduction and sulfonium conversion, or by introducing a sulfide and then converting this sulfide to a sulfonium by reaction with an acid or an alkyl halide, if necessary followed by anion exchange. From the viewpoint of ready availability of reactants, the method using a sulfide/acid mixture is preferred.

Said sulfide is not particularly restricted but can include, among others, aliphatic sulfides, aliphatic-aromatic mixed sulfides, aralkyl sulfides and cyclic sulfides. More specifically, there may be mentioned, for example, diethyl sulfide, dipropyl sulfide, dibutyl sulfide, dihexyl sulfide, diphenyl sulfide, ethyl phenyl sulfide, tetramethylene sulfide, pentamethylene sulfide, thiodiethanol, thiodipropanol, thiodibutanol, 1-(2-hydroxyethylthio)-2-propanol, 1-(2-hydroxyethylthio)-2-butanol, 1-(2-hydroxyethylthio)-3-butoxy-1-propnol and the like.

The acid mentioned above is not particularly restricted provided that it can serve as a counter ion to the sulfonium group. Thus, there may be mentioned, for example, formic acid, acetic acid, lactic acid, propionic acid, boric acid, butyric acid, dimethylolpropionic acid, hydrochloric acid, sulfuric acid, phosphoric acid, N-acetylglycine, N-acetyl-β-alanine and the like.

Generally preferred as the proportions of the sulfide and acid in said sulfide/acid mixture are approximately sulfide/acid=100/60 to 100/100 on the mole basis.

Said alkyl halide is not particularly restricted but can include methyl fluoride, methyl chloride, methyl bromide, methyl iodide, ethyl iodide, propyl iodide, isopropyl iodide, for example.

The reaction in step (2) can be carried out, for example, by mixing the epoxy resin containing carbon—carbon unsaturated bond as obtained in step (1) and the sulfide/acid mixture, for instance, in an amount sufficient to give the sulfonium group content specified above, with 5 to 10 moles, per mole of the sulfide, of water and then stirring generally at 50 to 90° C. for several hours. The end point of the reaction can advisably be judged by a residual acid value of not more than 5. The sulfonium introduction in the resin composition obtained can be confirmed by potentiometric titration.

In cases where sulfide introduction is followed by its conversion reaction to sulfonium group, the reaction can be carried out essentially under the same conditions as mentioned above.

As mentioned above, the decomposition of the sulfonium group upon heating can be avoided by carrying out the sulfonium introduction after the carbon—carbon unsaturated bond introduction.

In the thus-obtained basic resin, there is incorporated an adequate amount of an amine compound, whereby the electrolyte bath can be stabilized.

In the cationic electrocoating composition for use in the method of electrolyte bath stabilization of the present invention, said basic resin itself has curability and therefore the use of a curing agent is not always necessary. For further improvement in curability, however, a curing agent may be used. As such curing agent, there may be mentioned, for instance, compounds having a plurality of at least one species of propargyl group and unsaturated double bond, for example compounds obtained by addition reaction of a propargyl-containing compound such as propargyl alcohol or an unsaturated double bond-containing compound such as (meth)acrylic acid or allyl alcohol to polyepoxides derived from novolak phenol or the like or to pentaerythritol tetraglycidyl ether or the like.

Said curing agent may be a self-emulsifiable emulsion obtained by introducing sulfonium group into the remaining glycidyl groups. The method of introducing said sulfonium group is not critical. Thus, for example, mention may be made of those methods mentioned above in relation to the production of the basic resin. An emulsion comprising cores derived by introducing unsaturated bond into all glycidyl groups and shells having both unsaturated bond and sulfonium group may also be used.

Said curing agent is preferably used in an amount of not more than 80% by weight relative to the resin solid content of the cationic electrocoating composition for use in the method of electrolyte bath stabilization of the present invention. When such curing agent is used, it is preferred that the unsaturated bond content and the sulfonium group content in the curing agent be adjusted so as to fall within the respective ranges specified above for the above cationic electrodeposition coating composition.

In the above cationic electrocoating composition, a curing catalyst may be used for promoting the curing reaction between unsaturated bonds. Such curing catalyst is not particularly restricted but can include, for example, transition metals such as nickel, cobalt, copper, manganese, palladium and rhodium with a ligand such as cyclopentadiene or acetylacetone or a carboxylic acid such as acetic acid bound thereto. Among these, copper acetylacetone complex and copper acetate are preferred. The level of said curing catalyst added is preferably 0.1 to 20 millimoles per 100 g of the nonvolatile matter in the above cationic electrocoating composition.

The above cationic electrocoating composition may contain, when necessary, one or more other components in ordinary use in cationic electrocoating compositions. Said other components are not particularly restricted but can include, for example, pigments, pigment dispersing resins, surfactants, antioxidants, ultraviolet absorbers and other coating additives.

Said pigments are not particularly restricted but can include, for example, color pigments such as titanium dioxide, carbon black, iron oxide red, etc.; rust preventing pigments such as basic lead silicate, aluminum phosphomolybdate, etc.; extenders such as kaolin, clay, talc, etc., and other pigments in general use in cationic electrocoating compositions.

The level of said pigments added is preferably 0 to 50% by weight as solid matter in the cationic electrocoating composition.

Said pigment dispersing resins are not particularly restricted but those pigment dispersing resins which are in general use can be used. Pigment dispersing resins containing sulfonium group and carbon—carbon unsaturated bond therein may also be used. Such pigment dispersing resins containing sulfonium group and unsaturated bond can be obtained, for example, by reacting a sulfide compound with a hydrophobic epoxy resin obtained by reacting a bisphenol type epoxy resin with a half-blocked isocyanate; or by reacting a sulfide compound with this resin in the presence of a monobasic acid and a hydroxyl-containing dibasic acid.

The cationic electrocoating composition for use in the method of of the invention can be obtained by blending the basic resin and the amine compound, as necessary, with other various components mentioned above, followed by dissolution or dispersion in water. It is preferably prepared so that the carbon—carbon unsaturated bond and sulfonium group contents in the cationic electrocoating composition may not deviate from the respective ranges mentioned above.

In the present invention, a bath is prepared by adjusting the above cationic electrocoating composition to a nonvolatile matter content of 10 to 30% and filled into an electrolyte vessel, for use. The substrate or article to be coated, which is to be immersed in the electrolyte bath, is not particularly restricted provided that it is electroconductive. Thus, for example, there may be mentioned iron sheets, steel sheets, aluminum sheets, surface treated modifications of these, and moldings of these, among others.

Electrocoating is carried out by applying generally a voltage of 50 to 500 V between the article, which is the cathode, and the anode. When the voltage applied is below 50 V, the electrodeposition will proceed insufficiently. A higher voltage than 500 V means an increased electric power consumption and is uneconomical. When the composition of the invention is used and a voltage within the above range is applied, a uniform coat can be formed all over the article without any abrupt increase in film thickness during the electrodeposition process.

The electrolyte bath temperature on the occasion of applying the voltage can generally be selected within the range of 10 to 45° C., for example it can adequately be set at 30° C. or the like temperature. In cases where the method for electrolyte bath stabilization according to the present invention is applied, it is sufficient to adjust said bath temperature within limits of selected temperature ±10° C., for instance. When the selected temperature is 30° C., desired electrodeposition coat can be obtained by controlling the bath temperature within the range of 20 to 40° C.

The electrodeposition process preferably comprises: (i) a step of immersing the article in the cationic electrocoating composition, (ii) a step of causing coat to deposit by applying a voltage between the article, which serves as the cathode, and the anode and (iii) a step of further applying a voltage on said deposit coat to thereby increase the electric resistance per unit volume of said coat. The period of voltage application depends on the electrodeposition conditions but, generally, it may be 2 to 4 minutes.

After completion of the electrodeposition process, the coated article as obtained above, either as such or after washing with water, is baked for curing at 120 to 260° C., preferably 160 to 220° C., for 10 to 30 minutes, to complete coating.

In case of using the cationic electrocoating composition of the method according to the invention, the electrodeposition coat after curing preferably has a thickness of 10 to 25 μm. If it is less than 10 μm, the anti-corrosion effect will be insufficient. If it exceeds 25 μm, the coating composition will be wasted. With the above cationic electrocoating composition, the coat formed by electrodeposition on the surface of the article is converted to a nonconductor by the electrolytic reduction reaction mentioned above, resulting in a great improvement in throwing power. Therefore, even when the coat thickness is within the above range, a uniform coat can be formed all over the coating target article and thus a sufficient corrosion resistance effect can be produced.

The amount of the remaining sulfonium group in the thus-formed electrodeposition coat is less than 50% relative to that of the sulfonium group in the coating composition. Thus, it is supposed that not less than 50% of the sulfonium group in said cationic electrocoating composition has been converted to the sulfide group.

The substrate carrying the thus-formed coat is further provided with intermediate coat and/or top coat as necessary depending on the intended use thereof. In the case of automotive coatings, for instance, it is a general practice to apply a solvent- or water-based or powder intermediate coating composition and bake the same for providing chipping resistance and further apply a base coating composition and a clear coating composition without curing the base coating (wet-on-wet coating), followed by simultaneous baking of these two coats (two coat one bake coating method). On that occasion, as a consideration regarding the environmental problems, it is recommendable to use a water-based coating composition as said base coating composition and a powder coating composition as said clear coating composition. In addition, it is of course possible to apply a solid system for which the one coat coating technique is used.

Figure 2:
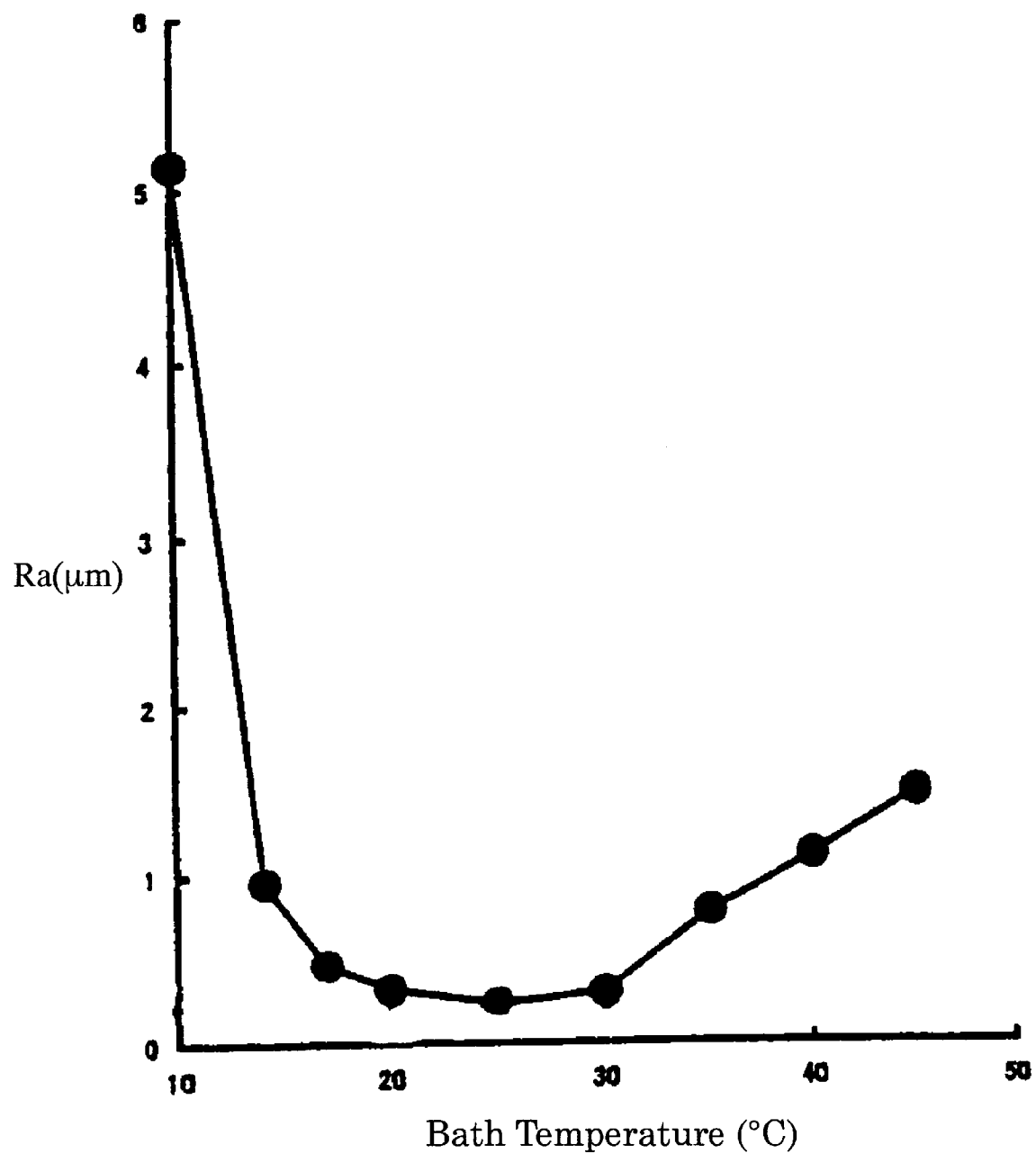
FIG. 2 is a graphic representation of the changes in deposit coat surface roughness encountered with a conventional cationic electrocoating composition (at a voltage of 250 V, SPC-treated sheets used) as a function of the temperature.

The method for electrolyte bath stabilization according to the present invention facilitates bath control for maintaining the desired deposit film thickness and smoothness or, in other words, renders the deposition behavior of the cationic electrocoating composition and the smoothness of the coats substantially independent on the bath temperature, presumably for the following reasons. Thus, in the case of the conventional cationic electrocoating compositions, in the initial stage of deposition of coatings, hydrogen gas generated from the electrode during the process of electrodeposition readily escapes through those gas passages in the deposit film which result from softening of the deposit film by Joule's heat on the occasion of electrodeposition, the process of deposition further proceeds and at last gas release is inhibited as a result of the increase in deposit film thickness and thereby the electrode reaction is inhibited. Throughout such process, the throwing power is thought to be produced in succession. Therefore, it is important for the progress of this deposition process that the deposit film softens due to Joule's heat on the occasion of electrodeposition and hydrogen gas generated on the electrode is readily released through the resulting gas passages in the deposit film. Thus, the influences of the bath temperature on the deposition behavior and smoothness of the coat are great. This fact is represented by FIG. 1 and FIG. 2, as already referred to.

On the other hand, the process of deposition of the cationic electrocoating composition in the cationic electrocoating process to which the method for electrolyte bath stabilization according to the present invention is applied is considered to attain the throwing power in succession through conversion of the sulfonium group, which is a hydratable group, to the sulfide group by the electrode reaction, hence conversion to a nonconductor, which is accompanied by an increase in electric resistance of the coating and, as a result thereof, cessation of deposition. Therefore, it is the process of conversion from sulfonium group to sulfide group that is important for the process of deposition to proceed. This conversion process is virtually governed by application of a voltage at the electrode and even when the bath temperature changes in the ordinary bath temperature range, said conversion process is modified only slightly. Thus, the process of deposition of the cationic electrocoating composition of the present invention is very little dependent on the temperature within a wide temperature range, unlike the conventional cationic electrocoating compositions. By adding a specific amount of an amine compound, it is possible to increase the rate of conversion of the sulfonium group to the sulfide group and, as a result, it is possible to stabilize the electrolyte bath.

When, in the cationic electrocoating process in which the method for electrolyte bath stabilization according to the present invention is applied, the content of the sulfonium remaining in the coating is rendered less than 40% of the sulfonium group contained in the electrocoating composition in the electrolyte bath, the differences in thickness among the coats obtained by electrocoating in the case of substrates differing in material can be minimized while maintaining the electrodeposition conditions constant. The following fact is thought to be contributive to this. Thus, in the cationic electrocoating process according to the present invention, the throwing power is thought to be produced in succession through conversion of the sulfonium group, which is a hydratable group, to the sulfide group by the electrode reaction, hence conversion to a nonconductor, an accompanying increase in electric resistance, and termination of deposition as a result thereof, as mentioned hereinabove. Therefore, the conversion of the sulfonium group to the sulfide group is important for the progress of the deposition process. By adjusting the rate of this conversion of sulfonium to sulfide to not less than 60%, namely adjusting the amount of the sulfonium group remaining in the coating obtained by electrodeposition to less than 40% of the sulfonium group in the cationic electrocoating composition to be electrodeposited, the electric resistance value of the deposit coating presumably increases markedly. This marked increase of the electric resistance of the deposit coating works as a dominant factor to reduce the differences in deposit film thickness even among substrate materials differing in electric resistance value.

BEST MODES FOR CARRYING OUT THE INVENTION

The following examples illustrate the present invention in further detail. The present invention is not limited to these examples alone, however.

PRODUCTION EXAMPLE 1

Production of sulfonium-, propargyl- and methacryloyl-containing resin for cationic electrocoating A separable flask equipped with a stirrer, thermometer, nitrogen inlet tube and reflux condenser was charged with 100.0 g of a cresol novolak type epoxy resin with an epoxy equivalent of 200.4 (Epototo YDCN-701 (trademark), product of Toto kasei), 13.5 g of propargyl alcohol and 0.3 g of dimethylbenzylamine. The contents were heated to 105° C. and the reaction was allowed to proceed for 3 hours. Then, the contents were cooled to 70° C., and a mixture of 15.5 g of methacrylic acid and 0.1 g of hydroquinone was added dropwise over 30 minutes. Upon completion of the dropping, the temperature was raised to 90° C., and the reaction was allowed to proceed at that temperature for 2 hours, to give a propargyl- and methacryloyl-containing resin with an epoxy equivalent of 1,655. To this was added 10.6 g of 1-(2-hydroxyethylthio)-2,3-propanediol, together with 4.7 g of glacial acetic acid and 7.0 g of deionized water. The reaction was allowed to proceed for 6 hours while maintaining the temperature at 75° C. After confirming that the residual acid value was not more than 5, 47.8 g of deionized water was added, to give the desired resin solution. This had a solids concentration of 70.0% by weight and a sulfonium value of 27.4 mmol/100 g varnish.

PRODUCTION EXAMPLE 2

Production of a sulfonium- , propargyl- and long-chain unsaturated fatty acid residue-containing resin composition for cationic electrocoating A separable flask equipped with a stirrer, thermometer, nitrogen inlet tube and reflux condenser was charged with 100.0 g of a cresol novolak type epoxy resin with an epoxy equivalent of 200.4 (Epototo YDCN-701 (trademark), product of Toto Kasei), 13.5 g of propargyl alcohol and 0.2 g of dimethylbenzylamine, the temperature was raised to 105° C., and the reaction was carried out for 1 hour to give a propargyl-containing resin composition with an epoxy equivalent of 445. Thereto was added 50.6 g of linolic acid and an additional 0.1 g of dimethylbenzylamine, and the reaction was continued at the same temperature for 3 hours, to give a propargyl- and long-chain unsaturated fatty acid residue-containing resin composition with an epoxy equivalent of 2,100. Thereto was added 10.6 g of 1-(2-hydroxyethylthio)-2,3-propanediol, 4.7 g of glacial acetic acid and 7.0 g of deionized water, and the reaction was carried out for 6 hours while maintaining the temperature at 75° C. and, after confirming that the residual acid value was less than 5, 62.9 g of deionized water was added to give the desired resin composition solution. This was a varnish having a solids content of 69.3% by weight and a sulfonium value of 23.5 millimoles per 100 grams.

COMPARATIVE PRODUCTION EXAMPLE 1

A separable flask equipped with a stirrer, thermometer, nitrogen inlet tube and reflux condenser was charged with 1,900.0 g of a bisphenol type epoxy resin with an epoxy equivalent of 950 (Epikote 1004 (trademark), product of Yuka Shell Epoxy) as obtained by reacting bisphenol A with epichlorohydrin in the presence of an alkali catalyst. This was dissolved in 993 g of ethylene glycol monobutyl ether, and 210 g of diethanolamine was then added dropwise while maintaining the reaction system at 90° C. After completion of the dropping, the temperature was raised to 110° C. and the reaction was allowed to proceed for 1.5 hours, to give a resin solution with a resin solids content of 68%. Then, a curing agent derived from diphenylmethanediisocyanate by blocking with ethylene glycol mono-2-ethylhexyl ether was admixed with the resin solution obtained at a solids weight ratio of (resin solution)/(curing agent)=75/25, followed by addition of 3% by weight of dibutyltin oxide. This resin composition (1,383 g; solids content 75%) was added to a mixed aqueous solution prepared in advance from 672 g of deionized water and 21 g of glacial acetic acid, and the mixture was stirred for 1 hour using a high-speed rotary stirrer. Then, 1,381.5 g of deionized water was further added to a solids concentration of 30% by weight. The resulting aqueous composition was used as an emulsion for comparative evaluation.

EXAMPLE 1

To 142.9 g of the sulfonium-, propargyl- and methacryloyl-containing resin for cationic electrocoating as obtained in Production Example 1, which was used as the basic resin, there were added 1.0 g of nickel acetylacetonate, 0.6 g of methylaminoethanol and 155.6 g of deionized water, and the mixture was stirred for 1 hour using a high-speed rotary mixer and then 373.3 g of deionized water was added to a solids concentration of 15% by weight. The resulting aqueous composition was used as an electrocoating composition.

EXAMPLE 2

To 144.3 g of the sulfonium-, propargyl- and long chain unsaturated fatty acid residue-containing resin for cationic electrocoating as obtained in Production Example 2, which was used as the basic resin, there were added 1.0 g of nickel acetylacetonate, 0.6 g of methylaminoethanol and 154.1 g of deionized water, and the mixture was stirred for 1 hour using a high-speed rotary mixer and then 373.3 g of deionized water was added to a solids concentration of 15% by weight. The resulting aqueous composition was used as an electrocoating composition.

COMPARATIVE EXAMPLE 1

To 142.9 g of the sulfonium-, propargyl- and methacryloyl-containing resin for cationic electrocoating as obtained in Production Example 1, which was used as the basic resin, there were added 1.0 g of nickel acetylacetonate and 156.2 g of deionized water, and the mixture was stirred for 1 hour using a high-speed rotary mixer and then 373.3 g of deionized water was added to a solids concentration of 15% by weight. The resulting aqueous composition was used as an electrocoating composition.

COMPARATIVE EXAMPLE 2

To 144.3 g of the sulfonium-, propargyl- and long chain unsaturated fatty acid residue-containing resin for cationic electrocoating as obtained in Production Example 2, which was used as the basic resin, there were added 1.0 g of nickel acetylacetonate and 154.7 g of deionized water, and the mixture was stirred for 1 hour using a high-speed rotary mixer and then 373.3 g of deionized water was added to a solids concentration of 15% by weight. The resulting aqueous composition was used as an electrocoating composition.

COMPARATIVE EXAMPLE 3

To 2,672 g of the emulsion for comparative evaluation as obtained in Comparative Production Example 1 was added 2,672 g of deionized water to a solids concentration of 15% by weight with stirring. To this aqueous solution was added 26.7 g of a 20% aqueous solution of dimethylaminoethanol with stirring in an attempt to prepare an electrocoating composition. However, in an instant, coagulation and separation occurred.

COMPARATIVE EXAMPLE 4

An electrocoating composition was prepared in the same manner as in Comparative Example 3 except that the addition of the aqueous solution of dimethylaminoethanol in the last stage was omitted.

EVALUATION OF EXAMPLES 1–2 AND COMPARATIVE EXAMPLES 1–4

(1) Measurement of Dry Coat Thickness

Using each of the electrocoating compositions prepared in the examples and comparative examples, an electrodeposited coating was formed by carrying out electrocoating at 250 V for 3 minutes using a cold-rolled steel sheet (JIS G 3141 SPCC-SD) as the anode and a stainless steel vessel as the cathode. Three levels of bath temperature, namely 15° C., 25° C. and 35° C., were used. Each coated article was taken out of the electrolyte bath, washed with water and baked at 160° C. for 20 minutes to give a dry coating. The thus-obtained coats were measured for dry coat thickness using an electromagnetic film thickness meter. The results thus obtained are shown in Table 1.

(2) Determination of Residual Sulfonium Group Content in Electrodeposited Coat

For each of the electrocoating compositions prepared in the examples and comparative examples, the sulfonium function concentration in the coating composition was determined using 0.1 N HCl (aqueous solution) on an potentiometric titration apparatus, whereby the sulfonium group content (a) per 100 g of resin solids was determined. Then, the electrodeposited coating formed at each bath temperature level was subjected, without baking/drying, to elution with tetrahydrofuran, and the sulfonium function concentration in the solution was determined by the same method, whereby the sulfonium group content (b) per 100 g of resin solids in the electrodeposited coating obtained by using each electrocoating composition was determined. The residual sulfonium group percentage in the electrodeposited coating was calculated as follows:

$$(b/a) \times 100 \ (\%).$$

The Results Thus Obtained Are Shown in Table 1.

(3) Measurement of Surface Roughness of Dry Coat

Using each of the electrocoating compositions prepared in the examples and comparative examples, an electrodeposited coating was formed by carrying out electrocoating at 250 V for 3 minutes using a cold-rolled steel sheet (JIS G 3141 SPCC-SD) as the anode and a stainless steel vessel as the cathode. Three levels of bath temperature, namely 15° C., 25° C. and 35° C., were used. Each coated article was taken out of the electrolyte bath, washed with water and baked at 160° C. for 20 minutes to give a dry coating. The thus-obtained coats were measured for surface roughness Ra ($\mu$m) using a surface roughness tester Handisurf E-30A (product of Tokyo Seimitsu). The results obtained are shown in Table 1.

TABLE 1

| | Residual sulfonium content (%) | dry coat thickness ($\mu$m) | | | Change in dry coat thickness at 15–35° C. ($\mu$m) | Surface roughness Ra ($\mu$m) | | | Change in surface roughness at 15–35° C. ($\mu$m) |
|---|---|---|---|---|---|---|---|---|---|
| | | 15° C. | 25° C. | 35° C. | | 15° C. | 25° C. | 35° C. | |
| Example 1 | 18 | 15 | 14 | 16 | 2 | 0.20 | 0.15 | 0.19 | 0.05 |
| Example 2 | 28 | 18 | 17 | 19 | 2 | 0.23 | 0.19 | 0.21 | 0.04 |
| Comparative Example 1 | 55 | 21 | 15 | 26 | 11 | 0.38 | 0.16 | 0.33 | 0.22 |
| Comparative Example 2 | 64 | 22 | 18 | 28 | 10 | 0.44 | 0.19 | 0.36 | 0.25 |
| Comparative Example 3 | No coating composition due to coagulation | | | | | | | | |
| Comparative Example 4 | — | 36 | 22 | 43 | 21 | 1.35 | 0.19 | 0.96 | 1.16 |

From the results shown in the table, it was found that when the method for electrolyte bath stabilization according to the present invention is employed, the changes in coat characteristics at 15 to 35° C. are markedly smaller as compared with the comparative examples and it is possible to form coats substantially identical in quality in said temperature range.

PRODUCTION EXAMPLE 3

Production of sulfonium-, propargyl- and vinyl-containing resin for cationic electrocoating A separable flask equipped with a stirrer, thermometer, nitrogen inlet tube and reflux condenser was charged with 100.0 g of a cresol novolak type epoxy resin with an epoxy equivalent of 200.4 (Epototo YDCN-701 (trademark), product of Toto Kasei), 13.5 g of propargyl alcohol, 10.5 g of allyl alcohol, 0.05 g of hydroquinone and 0.3 g of dimethylbenzylamine. The contents were heated to 105° C. and the reaction was allowed to proceed for 3 hours, to give a propargyl- and vinyl-containing resin with an epoxy equivalent of 1,590. Thereto were added 10.6 g of 1-(2-hydroxyethylthio)-2,3-propanediol, 4.7 g of glacial acetic acid and 7.0 g of deionized water. The reaction was allowed to proceed for 6 hours while maintaining the temperature at 75° C. After confirming that the residual acid value was not more than 5, 45.6 g of deionized water was added, to give the desired resin solution. This had a solids concentration of 70.9% by weight and a sulfonium value of 27.6 mmol/100 g varnish.

PRODUCTION EXAMPLE 4

Production of sulfonium-, propargyl- and copper acetvlide-containing resin for cationic electrocoating A separable flask equipped with a stirrer, thermometer, nitrogen inlet tube and reflux condenser was charged with 100.0 g of a cresol novolak type epoxy resin with an epoxy equivalent of 200.4 (Epototo YDCN-701 (trademark), product of Toto Kasei), 23.6 g of propargyl alcohol and 0.3 g of dimethylbenzylamine. The contents were heated to 105° C. and the reaction was allowed to proceed for 3 hours, to give a propargyl-containing resin with an epoxy equivalent of 1,580. Thereto was added 2.5 g of copper acetylacetonate, and the reaction was allowed to proceed at 90° C. for 1.5 hours. Partial disappearance of the terminal hydrogen atom of the propargyl group added was confirmed by proton (1H) NMR (corresponding to 14 mmol/100 g resin solids). To the reaction product were added 10.6 g of 1-(2-hydroxyethylthio)-2,3-propanediol, 4.7 g of glacial acetic acid and 7.0 g of deionized water. The reaction was allowed to proceed for 6 hours while maintaining the temperature at 75° C. After confirming that the residual acid value was not more than 5, 43.8 g of deionized water was added, to give the desired resin solution. This had a solids concentration of 70.0% by weight and a sulfonium value of 28.0 mmol/100 g varnish.

PRODUCTION EXAMPLE 5

Production of sulfonium-, propargyl-, long chain unsaturated fatty acid residue- and copper acetylide-containing resin for cationic electrocoating A separable flask equipped with a stirrer, thermometer, nitrogen inlet tube and reflux condenser was charged with 100.0 g of a cresol novolak type epoxy resin with an epoxy equivalent of 200.4 (Epototo YDCN-701 (trademark), product of Toto Kasei), 13.5 g of propargyl alcohol and 0.2 g of dimethylbenzylamine. The contents were heated to 105° C. and the reaction was allowed to proceed for 1 hour, to give a propargyl-containing resin with an epoxy equivalent of 445. Thereto was added 50.6 g of linolic acid and an additional 0.1 g of dimethylbenzylamine, and the reaction was allowed to proceed at the same temperature for 3 hours, to give a propargyl- and long chain unsaturated fatty acid residue-containing resin with an epoxy equivalent of 2,100. To this was added 3.2 g of copper acetylacetonate, and the reaction was allowed to proceed at 90° C. for 1.5 hours, to give a resin with a part of the propargyl group converted to copper acetylide. Partial disappearance of the terminal hydrogen atom of the propargyl group added was confirmed by proton (1H) NMR (corresponding to 14 mmol/100 g resin solids). To the reaction product were added 10.6 g of 1-(2-hydroxyethylthio)-2,3-propanediol, 4.7 g of glacial acetic acid and 7.0 g of deionized water. The reaction was allowed to proceed for 6 hours while maintaining the temperature at 75° C. After confirming that the residual acid value was not more than 5, 60.8 g of deionized water was added, to give the desired resin solution. This had a solids concentration of 70.6% by weight and a sulfonium value of 23.1 mmol/100 g varnish.

EXAMPLE 3

To 141.0 g of the sulfonium-, propargyl- and vinyl-containing resin for cationic electrocoating as obtained in Production Example 3, which was used as the basic resin, there were added 1.0 g of nickel acetylacetonate, 0.5 g of monoethanolamine and 157.5 g of deionized water. The mixture was stirred for 1 hour using a high-speed rotary mixer, and 373.3 g of deionized water was further added to a solids concentration of 15% by weight. The resulting aqueous composition was used as an electrocoating composition.

EXAMPLE 4

To 142.9 g of the sulfonium-, propargyl- and copper acetylide-containing resin for cationic electrocoating as obtained in Production Example 4, which was used as the basic resin, there were added 0.5 g of monoethanolamine and 156.6 g of deionized water. The mixture was stirred for 1 hour using a high-speed rotary mixer, and 373.3 g of deionized water was further added to a solids concentration of 15% by weight. The resulting aqueous composition was used as an electrocoating composition.

EXAMPLE 5

To 141.6 g of the sulfonium-, propargyl-, long chain unsaturated fatty acid residue- and copper acetylide-containing resin for cationic electrocoating as obtained in Production Example 5, which was used as the basic resin, there were added 0.5 g of monoethanolamine and 157.9 g of deionized water. The mixture was stirred for 1 hour using a high-speed rotary mixer, and 373.3 g of deionized water was further added to a solids concentration of 15% by weight. The resulting aqueous composition was used as an electrocoating composition.

COMPARATIVE EXAMPLE 5

To 141.0 g of the sulfonium-, propargyl- and vinyl-containing resin for cationic electrocoating as obtained in Production Example 1, which was used as the basic resin, there were added 1.0 g of nickel acetylacetonate and 158.0 g of deionized water. The mixture was stirred for 1 hour using a high-speed rotary mixer, and 373.3 g of deionized water was further added to a solids concentration of 15% by weight. The resulting aqueous composition was used as an electrocoating composition.

COMPARATIVE EXAMPLE 6

To 142.9 g of the sulfonium-, propargyl- and copper acetylide-containing resin for cationic electrocoating as obtained in Production Example 2, which was used as the basic resin, there was added 157.1 g of deionized water. The mixture was stirred for 1 hour using a high-speed rotary mixer, and 373.3 g of deionized water was further added to a solids concentration of 15% by weight. The resulting aqueous composition was used as an electrocoating composition.

COMPARATIVE EXAMPLE 7

To 141.6 g of the sulfonium-, propargyl-, long chain unsaturated fatty acid residue- and copper acetylide-containing resin for cationic electrocoating as obtained in Production Example 3, which was used as the basic resin, there was added 158.4 g of deionized water. The mixture was stirred for 1 hour using a high-speed rotary mixer, and 373.3 g of deionized water was further added to a solids concentration of 15% by weight. The resulting aqueous composition was used as an electrocoating composition.

EVALUATION OF EXAMPLES 3–5 AND COMPARATIVE EXAMPLES 5–7

(1) Measurement of Dry Coat Thickness

Cationic electrocoating was carried out using each of the steel sheets listed below as the substrate and cathode and a stainless steel vessel as the anode and using each electrocoating composition obtained, at a bath temperature of 25° C. The electrodeposition conditions were: 250 V×3 minutes. Each coated article was taken out of the electrolyte bath, washed with water and baked at 160° C. for 25 minutes to give an electrodeposited coating. The thus-obtained coats were measured for dry coat thickness using an electromagnetic film thickness meter. The results obtained are shown in Table 2.

Steel Sheets

Material 1: Cold-rolled steel sheet (JIS G 3141 SPCC-SD)
Material 2: Zinc phosphate-treated cold-rolled steel sheet (JIS G 3141 SPCC-SD, treated with Surfdine SD-5000 (product of Nippon Paint)
Material 3: Molten alloy zinc-plated steel sheet (Silver Alloy (trademark), product of Nippon Steel Corp.)
Material 4: Zinc phosphate-treated molten alloy zinc-plated steel sheet (Silver Alloy (trademark), product of Nippon Steel Corp., treated with Surfdine SD-5000 (product of Nippon Paint)

(2) Determination of Residual Sulfonium Group Percentage in Electrodeposited Coats The residual sulfonium group percentages were determined in the same manner as mentioned above under evaluation (2) for Examples 1 and 2 and Comparative Examples 1 to 4. The results are shown in Table 2.

TABLE 2

| | Dry coat thickness ($\mu$m) (upper) and residual sulfonium group (%) (lower) | | | | |
| --- | --- | --- | --- | --- | --- |
| | Material | | | | Difference in dry coat thickness among materials |
| | 1 | 2 | 3 | 4 | ($\mu$m) |
| Example 3 | 18 | 17 | 17 | 16 | 2 |
| | 25 | 26 | 20 | 18 | |
| Example 4 | 14 | 13 | 15 | 13 | 2 |
| | 18 | 15 | 20 | 17 | |
| Example 5 | 17 | 18 | 17 | 17 | 1 |
| | 29 | 25 | 22 | 24 | |
| Comparative Example 5 | 38 | 18 | 17 | 18 | 20 |
| | 70 | 25 | 27 | 30 | |
| Comparative Example 6 | 28 | 15 | 15° | 14 | 14 |
| | 56 | 21 | 22 | 19 | |
| Comparative Example 7 | 33 | 17 | 18 | 17 | 16 |
| | 62 | 25 | 29 | 24 | |

EFFECTS OF THE INVENTION

The method for electrolyte bath stabilization according to the present inventioin, which has the constitution mentioned above, broadens the allowable bath temperature range in electrocoating. Therefore, the cooling apparatus for controlling the bath temperature rise due to Joule's heat upon application of electric current can be small-sized and the burden of bath control can be markedly reduced. Furthermore, high levels of throwing power can be realized, so that the coating composition consumption can be saved and coating conditions enabling formation of good coats excellent in smoothness can be realized over a wide temperature range. Said method is thus very advantageous from the industrial viewpoint.

When, in the cationic electrodeposition process in which the method for electrolyte bath stabilization according to the present invention is applied, the amount of the sulfonium group remaining in the coat is less than 40% of that of the sulfonium group contained in the electrocoating composition in the electrolyte bath, the coats obtained by electrocoating of different substrate materials show only small differences from material to material. Therefore, uniform electrodeposited coats can be formed while preventing the influences of the surface treatment state of the substrate material. Furthermore, it is possible to form coats of the same quality by performing electrocoating of different materials in one and the same line. Thus, said method is very advantageous from the industrial viewpoint.

What is claimed is:

1. A method of stabilization of electrolyte bath in electrocoating for obtaining electrodeposition coat by immersing a substrate in the electrolyte bath filled with a cationic electrocoating composition containing a basic resin and an amine compound and carrying out electrocoating;
    wherein said basic resin in said electrolyte bath contains, per 100 grams of the resin solids, 10 to 300 millimoles of sulfonium group and 50 to 2,000 millimoles of carbon—carbon unsaturated bond, and;
    said amine compound is contained in an amount of 1 to 50 millimoles per 100 grams of the basic resin solids in the electrolyte bath, said amount being not less than 5 mole percent relative to the sulfonium group content in said basic resin, so that the sulfonium group remaining in said electrodeposition coat amount to not more than 50% relative to the sulfonium group contained in the electrocoating composition in said electrolyte bath.

2. The method of stabilization as claimed in claim 1, wherein carbon—carbon triple bond of propargyl group accounts for at least 15% of said carbon—carbon unsaturated bond.

3. The method of stabilization as claimed in claim 1, wherein the basic resin is a resin having a skeleton of epoxy resin.

4. The method of stabilization as claimed in claim 3, wherein the epoxy resin is at least one member selected from the group consisting of novolak cresol type epoxy resins and novolak phenol type epoxy resins.

5. The method of stabilization as claimed in claim 1, wherein the sulfonium group content is 10 to 250 millimoles, the carbon—carbon unsaturated bond content is 80 to 500 millimoles and the amount of the amine compound incorporated is 1 to 30 millimoles, per 100 grams of the resin solids, said amount of amine compound being not less than 7 mole percent relative to the sulfonium group content in the basic resin, and the sulfonium group remaining in the coat obtained by electrodeposition being less than 40% of the sulfonium group contained in the basic resin in the cationic electrocoating composition subjected to electrocoating.

6. The method of stabilization as claimed in claim 2, wherein the basic resin is a resin having a skeleton of epoxy resin.

7. Ihe method of stabilization as claimed in claim 2, wherein the sulfonium group content is 10 to 250 millimoles, the carbon—carbon unsaturated bond content is 80 to 500 millimoles and the amount of the amine compound incorporated is 1 to 30) millimoles, per 100 grams of the resin solids, said amount of amine compound being not less than 7 mole percent relative to the sulfonium group content in the basic resin, and the sulfonium group remaining in the coat obtained by electrodeposition being less than 40% of the sulfonium group contained in the basic resin in the cationic electrocoating composition subjected to electrocoating.

8. The method of stabilization as claimed in claim 3, wherein the sulfonium group content is 10 to 250 millimoles, the carbon—carbon unsaturated bond content is 80 to 500 millimoles and the amount of the amine compound incorporated is 1 to 30 millimoles, per 100 grams of the resin solids, said amount of amine compound being not less than 7 mole percent relative to the sulfonium group content in the basic resin, and the sulfonium group remaining in the coat obtained by electrodeposition being less than 40% of the sulfonium group contained in the basic resin in the cationic electrocoating composition subjected to electrocoating.

9. The method of stabilization as claimed in claim 4, wherein the sulfonium group content is 10 to 250 millimoles, the carbon—carbon unsaturated bond content is 80 to 500 millimoles and the amount of the amine compound incorporated is 1 to 30 millimoles, per 100 grams of the resin solids, said amount of amine compound being not less than 7 mole percent relative to the sulfonium group content in the basic resin, and the sulfonium group remaining in the coat obtained by electrodeposition being less than 40% of the sulfonium group contained in the basic resin in the cationic electrocoating composition subjected to electrocoating.

* * * * *